(12) United States Patent
Wittkopp et al.

(10) Patent No.: US 8,091,696 B2
(45) Date of Patent: Jan. 10, 2012

(54) ROCKER CLUTCH ASSEMBLY

(75) Inventors: Scott H. Wittkopp, Ypsilanti, MI (US);
James M. Hart, Belleville, MI (US);
Clinton E. Carey, Monroe, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 741 days.

(21) Appl. No.: 11/622,602

(22) Filed: Jan. 12, 2007

(65) Prior Publication Data

US 2008/0169166 A1    Jul. 17, 2008

(51) Int. Cl.
*F16D 41/06* (2006.01)

(52) U.S. Cl. ............................ 192/43.1; 192/46; 192/47

(58) Field of Classification Search ................ 192/43.1, 192/46, 47, 48.92
See application file for complete search history.

(56) References Cited

U.S. PATENT DOCUMENTS

| | | | | |
|---|---|---|---|---|
| 1,163,500 | A * | 12/1915 | Ball ................................ 81/132 |
| 1,509,446 | A * | 9/1924 | Skinner ........................... 192/47 |
| 2,143,121 | A * | 1/1939 | Cox ............................. 192/43.1 |
| 2,710,504 | A | 6/1955 | Dodge |
| 2,773,574 | A * | 12/1956 | Able ............................ 192/43.1 |
| 4,187,728 | A * | 2/1980 | Mazzorana ........................ 74/6 |
| 5,170,870 | A * | 12/1992 | Kampf ............................ 192/28 |
| 5,967,277 | A * | 10/1999 | Walter ......................... 192/43.1 |
| 5,992,592 | A * | 11/1999 | Showalter .................... 192/43.1 |
| 6,290,044 | B1 * | 9/2001 | Burgman et al. ............... 192/46 |
| 6,427,547 | B1 | 8/2002 | Bowen |
| 6,814,201 | B2 | 11/2004 | Thomas |
| 6,905,009 | B2 | 6/2005 | Reed et al. |
| 7,258,214 | B2 | 8/2007 | Pawley et al. |
| 7,344,010 | B2 | 3/2008 | Fetting, Jr. et al. |
| 7,484,605 | B2 | 2/2009 | Pawley et al. |
| 7,491,151 | B2 | 2/2009 | Maguire et al. |
| 7,563,191 | B2 | 7/2009 | Maguire et al. |
| 2006/0021835 | A1 | 2/2006 | Kimes et al. |
| 2006/0278486 | A1 * | 12/2006 | Pawley et al. ................ 192/43.1 |
| 2006/0278487 | A1 * | 12/2006 | Pawley et al. ................ 192/43.1 |
| 2007/0278061 | A1 * | 12/2007 | Wittkopp et al. ............ 192/43.1 |
| 2008/0185253 | A1 * | 8/2008 | Kimes ............................. 192/46 |

OTHER PUBLICATIONS

Office Action mailed Aug. 19, 2009, U.S. Appl. No. 11/742,859.

* cited by examiner

*Primary Examiner* — David D Le
*Assistant Examiner* — Terry Chau
(74) *Attorney, Agent, or Firm* — Quinn Law Group, PLLC

(57) ABSTRACT

A clutch assembly includes a first race and a second race that is selectively rotatable with respect to the first race about an axis of rotation. A plurality of rockers is operatively connected to the first race and spring biased into engagement with the second race to transmit torque between the first and second races. A member is selectively translatable between first and second positions to control the ability of the rockers to transmit torque between the first and second rockers, and thereby to control the ability of the races to rotate relative to one another.

5 Claims, 5 Drawing Sheets

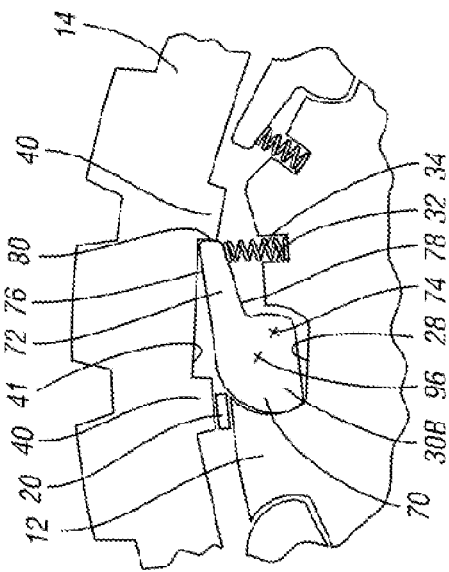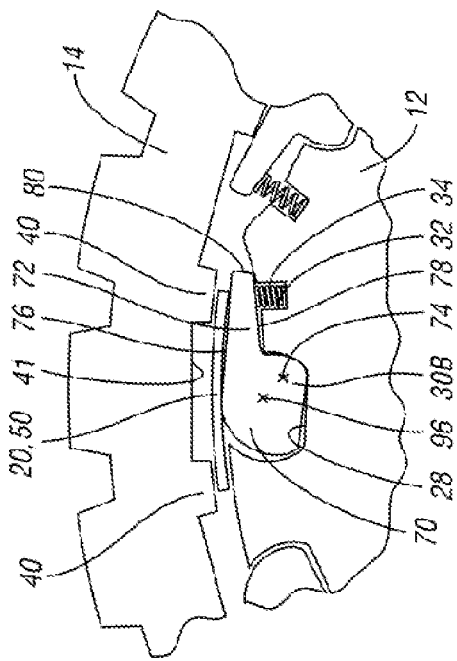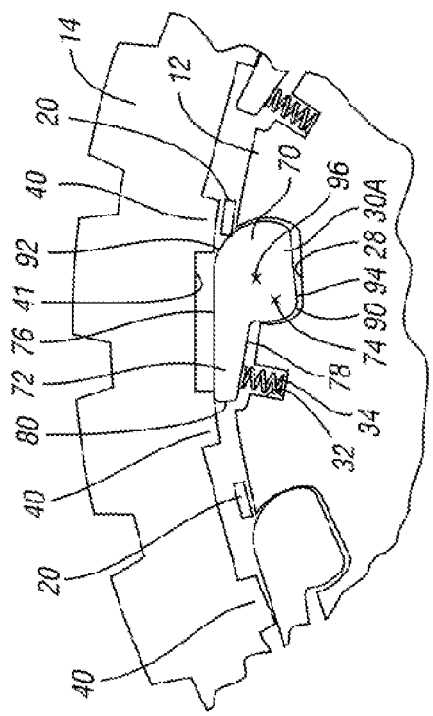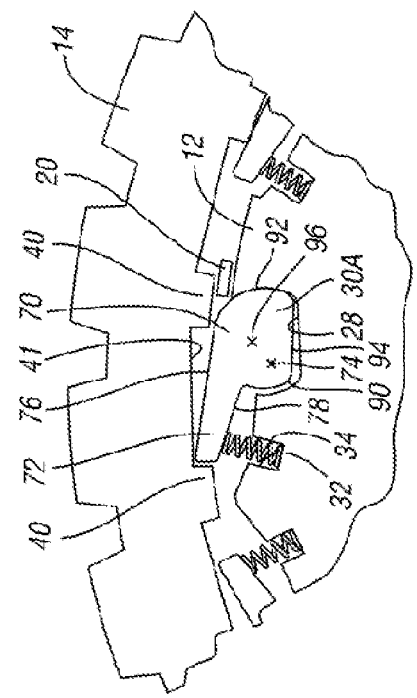
FIG. 2c
FIG. 2d
FIG. 2e
FIG. 3c

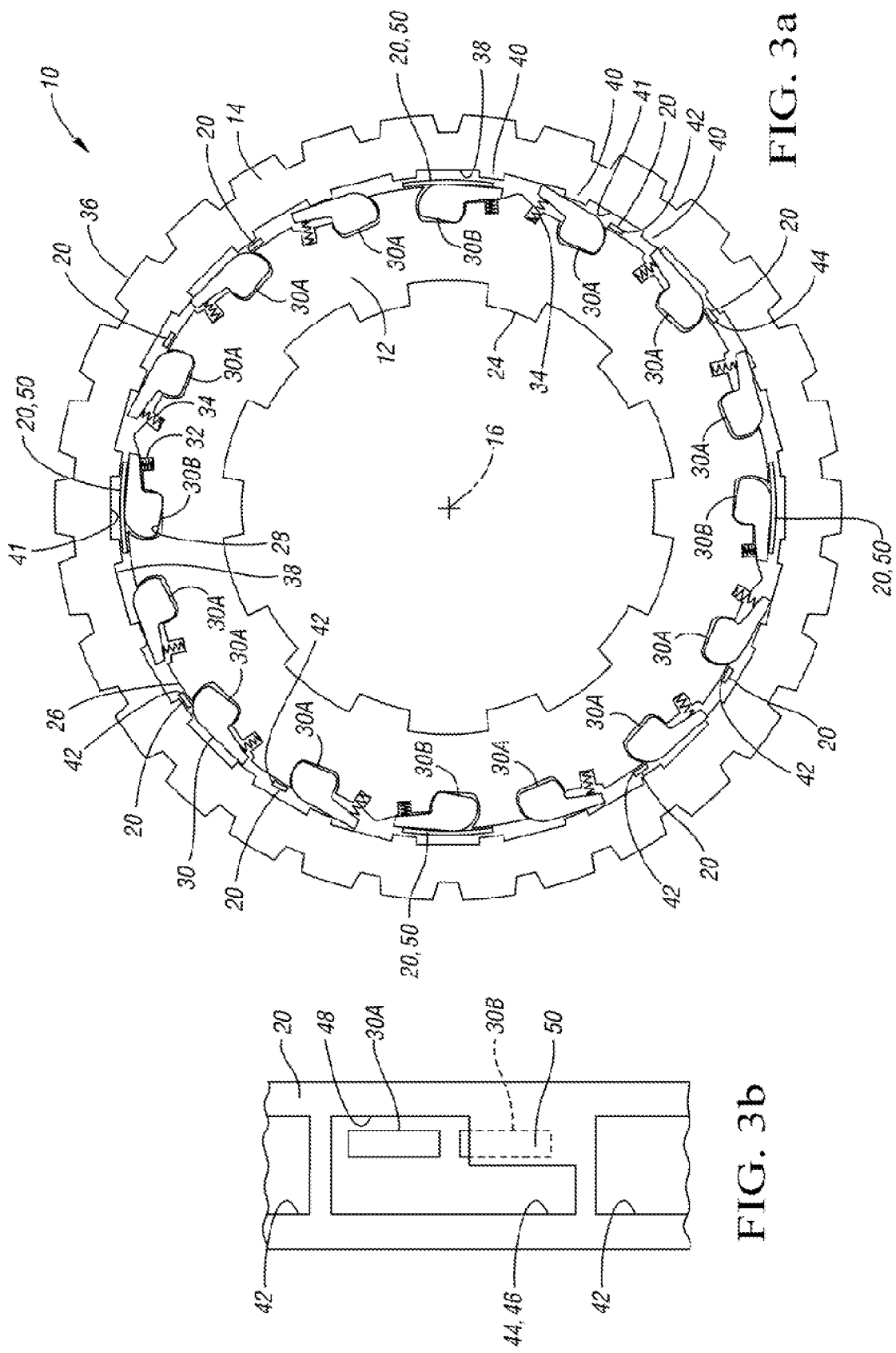

ROCKER CLUTCH ASSEMBLY

TECHNICAL FIELD

This invention relates to rocker clutches having selectively variable modes of operation.

BACKGROUND OF THE INVENTION

The prior art includes one-way clutches that are configured to prevent rotation of a first member relative to a second member in one direction, and to permit rotation of the first member relative to the second member in another direction. Vehicle powertrains may employ one-way clutches. For example, a one-way clutch may be implemented to transfer torque from an engine to the transmission, and to interrupt the transfer of reverse torque from the transmission to the engine. Prior art one-way clutches include roller-type clutches and sprag-type clutches.

SUMMARY OF THE INVENTION

A clutch assembly includes a first race defining a plurality of pockets, a second race being selectively rotatable with respect to the first race about an axis and defining a plurality of teeth, a plurality of springs, and a plurality rockers. Each of the rockers is at least partially positioned within a respective pocket, and is biased by one of the springs into engagement with the teeth.

A selector member is selectively axially translatable between a first position and a second position. In the first position, the selector member permits engagement of at least one of the rockers with the teeth. In the second position, the selector member prevents engagement of the at least one of the rockers with the teeth. Accordingly, the ability of the first rocker to transmit torque between the first and second races is controllable by moving the selector member.

The clutch assembly provided herein enables high packaging efficiency since the selectively variable torque carrying capacity is accomplished with a single pair of races. Furthermore, the axial translation of the selector member facilitates implementation of the clutch assembly into existing systems that may already have an axial actuator in place, such as a clutch piston.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 2c is a schematic cross-sectional side view of one of the first plurality of rockers in a first interaction with the outer race;

FIG. 2d is a schematic cross-sectional side view of the rocker of FIG. 2c in a second interaction with the outer race;

FIG. 2e is a schematic cross-sectional side view of one of the second plurality of rockers interacting with the outer race;

FIG. 3a is a schematic, cross-sectional view, taken along a plane that is perpendicular to the axis of rotation, of the clutch assembly of FIG. 1 with the selector ring in a second position;

FIG. 3b is a schematic depiction of the two rockers of FIG. 2b with the selector ring in the second position;

FIG. 3c is a schematic cross-sectional side view of one of the second plurality of rockers in a retracted position.

DESCRIPTION OF THE PREFERRED EMBODIMENTS

Figure 1:
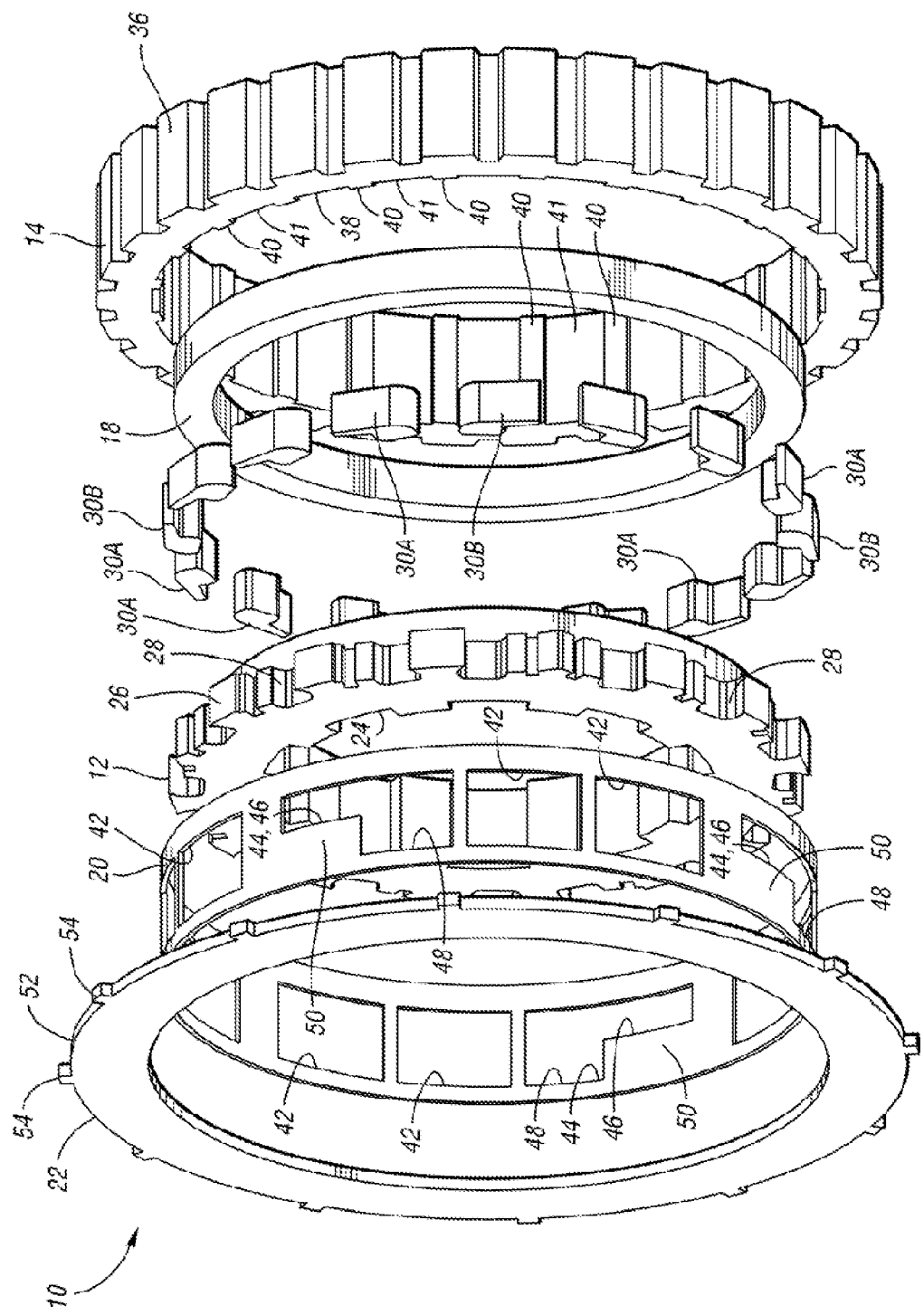
FIG. 1 is an exploded perspective view of a rocker clutch assembly including a selector ring, an inner race, an outer race, and first and second pluralities of rockers.

Referring to FIG. 1, a rocker clutch assembly 10 is schematically depicted. The rocker clutch assembly 10 may be used, for example, to control the torque transfer in an automatic transmission, a manual transmission, a hybrid vehicle, a dual clutch transmission, a transfer case, or an engine accessory drive. The rocker clutch assembly 10 includes a generally annular inner race 12 and a generally annular outer race 14. The inner race 12 and the outer race 14 are coaxially positioned about an axis (shown at 16 in FIG. 2a). A bushing 18 is preferably provided to pilot the outer race 14 as it rotates relative to the inner race 12. A selector member, such as selector ring 20, is positioned radially between the inner race 12 and the outer race 14. The rocker clutch assembly 10 also includes an apply plate 22 that is selectively translatable in an axial direction in order to cause axial translation of the selector ring 20.

The inner race 12 defines an inner surface 24 that is preferably splined to facilitate attachment to a shaft member (not shown). The outer surface 26 of the inner race 12 defines a plurality of pockets 28. The clutch assembly 10 also includes a first plurality of rockers 30A and a second plurality of rockers 30B. Rockers 30A, 30B are identical to each other except for their orientation. Each pocket 28 includes a respective recess (shown at 32 in FIG. 2a) configured to retain a respective spring (shown at 34 in FIG. 2a).

The outer race 14 defines an outer surface 36 that is preferably splined to facilitate attachment to a shaft member (not shown). The inner surface 38 of the outer race 14 defines a plurality of teeth 40. The teeth 40 define notches 41 therebetween.

The selector ring 20 defines a plurality of rectangular windows 42 and a plurality of L-shaped windows 44. Each of the windows 44 includes a narrow portion 46 and a wide portion 48. More specifically, the narrow portions 46 have a smaller axial dimension than the wide portions 48. The selector ring 20 is characterized by portions 50. Each of portions 50 partially define a respective narrow portion 46 and a respective wide portion 58.

The apply plate 22 has a radially outer surface 52 defining a plurality of teeth 54. The teeth 54 are configured to engage a complementary feature on an external member (not shown) such that the apply plate 22 is prevented from rotating about the axis. The apply plate 22 is operatively connected to the selector ring 20 such that axial movement of the plate 22 results in axial movement of the ring 20.

Figure 2A:
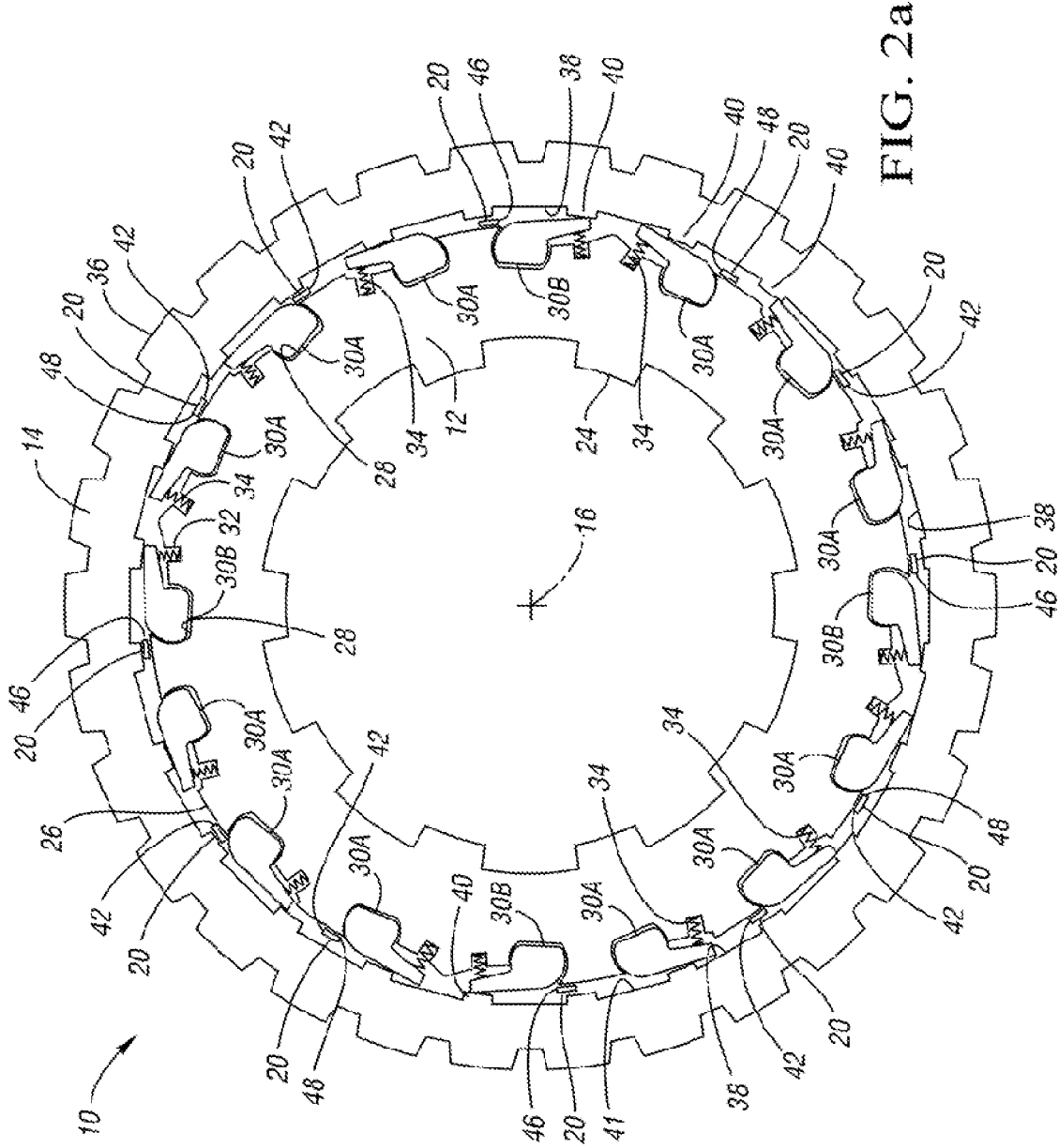
FIG. 2a is a schematic cross-sectional view, taken along a plane that is perpendicular to an axis of rotation, of the clutch assembly of FIG. 1 with the selector ring in a first position.

Referring to FIG. 2a, wherein like reference numbers refer to like components from FIG. 1, the outer race 14 is disposed concentrically around the inner race 12, such that the outer surface 26 of the inner race 12 is in juxtaposition with the inner surface 38 of the outer race 14, and such that the pockets 28 are open in the direction of the teeth 40. Each of the first plurality of rockers 30A and each of the second plurality of rockers 30B is partially disposed within a respective one of the pockets 28, and is biased by a respective spring 34 into engagement with the teeth 40. The outer race 14 is selectively rotatable with respect to the inner race 12 about axis 16.

Figure 2B:
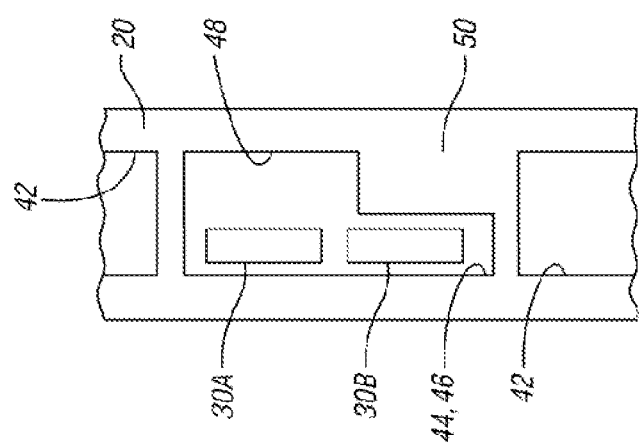
FIG. 2b is a schematic, cross-sectional depiction of two of the rockers and the selector ring in the first position.

Referring to FIGS. 2a and 2b, the selector ring 20 is disposed radially between the inner race 12 and the outer race 14, and is depicted in a first position in which each window 42 is positioned such that a respective one of the first plurality of rockers 30A is extendable radially therethrough. When the ring 20 is in the first position, each wide portion 48 of windows 44 is positioned such that a respective one of the first plurality of rockers 30A is extendable radially therethrough. When the ring 20 is in the first position, each narrow portion 46 of the windows 44 is positioned such that a respective one of the second plurality of rockers 30B is extendable radially therethrough. Each of the first plurality of rockers 30A is extendable through one of the windows 42 or one of the wide portions 48. Each of the second plurality of rockers 30B is extendable through one of the narrow portions 46.

Referring to FIG. 2c, wherein like reference numbers refer to like components from FIGS. 1 and 2a-b, a rocker 30A is depicted interacting with the inner race 12 and the outer race 14; the rocker 30A depicted in FIG. 2c is representative of all of the first plurality of rockers 30A. Rocker 30A includes a body portion 70 and an engagement arm or pawl 72 protruding from the body portion 70. According to the preferred embodiment, the engagement arm 72 defines generally opposing first and second surfaces 76, 78, and a terminal end surface 80. Each pocket 28 includes a recess 32 adapted to retain a spring 34. Each spring 34 extends from a respective recess 32 and engages a respective one of rockers 30A such that a portion of the rocker is biased into engagement with the teeth 40 of the outer race 14.

More specifically, spring 34 contacts surface 78, urging the engagement arm 72 radially outward toward the outer race 14 so that the engagement arm 72 engages the teeth 40. In the context of the present application, an engagement arm 72, or a rocker 30A, 30B, engages teeth when a portion of the rocker or engagement arm is at a radial distance from the axis (shown at 16 in FIG. 2a) sufficient to contact one of the teeth 40. In the embodiment depicted, spring 34 biases the engagement arm 72 sufficiently radially outward such that, absent a counteracting force, the engagement arm 72 extends into one of the notches 41 defined between the teeth 40.

Each rocker 30A is configured to permit rotation of the outer race 14 with respect to the inner race 12 about the axis 16 in a first direction and to prevent rotation of the outer race 14 with respect to the inner race 12 about the axis 16 in a second direction when the rocker 30A engages the teeth 40 of the outer race 14. In other words, rockers 30A are configured not to transmit torque between the inner and outer races 12, 14 in the first direction, and to transmit torque between the races 12, 14 in the second direction.

More specifically, the rocker 30A is configured such that, if the outer race 14 rotates counterclockwise relative to the inner race 12, one of the teeth 40 contacts surface 76 of the rocker 30A. The orientation of the surface 76, and the angle at which the tooth 40 contacts the surface 76, is such that the tooth 40 applies a force on the surface 76 that rotates the engagement arm 72 of the rocker 30A about a pivot axis 74 away from the outer race 14, compressing the spring 34. The rotation of the engagement arm 72 permits the tooth 40 to slide across surface 76 during relative rotation of the outer race with respect to the inner race in the counterclockwise direction, and therefore rockers 30A do not prevent rotation of the outer race with respect to the inner race in the counterclockwise direction. Pivot axis 74 is parallel to axis 16.

Referring to FIG. 2d, wherein like reference numbers refer to like components from FIGS. 1-2c, rocker 30A is depicted with the engagement arm 72 extending radially outward into notch 41. If the outer race 14 rotates clockwise with respect to the inner race 12, a tooth 40 contacts surface 80 of the engagement arm 72. The orientation of the surface 80, and the angle at which the tooth 40 contacts the surface 80, is such that the tooth 40 applies a force on the surface 80, and surface 80 transmits a corresponding reaction force on the tooth, that prevents the outer race 14 from rotating with respect to the inner race 12 in the clockwise direction.

According to the preferred embodiment, the body portion 70 of each rocker 30A defines surfaces 90, 92 and 94. Surfaces 90 and 92 are both circular cylindrical surfaces whose arcs are concentric with the pivot center 74. The surfaces 90, 92 are configured to guide rotation or pivoting of the rocker 30A about the pivot center 74 and limit that pivoting to one degree of freedom.

When surface 80 is in contact with a tooth 40, as shown in FIG. 2d, a reaction force is applied to surface 92 from the inner race 12, and there is preferably no reaction force applied to surface 90. Because the center of surface 92 is preferably located at the pivot center 74, this reaction force is distributed along surface 92 and produces no torque tending to pivot the rocker 30A about the pivot center 74. The surface 94 is configured to limit the rotation or pivoting of the rocker 30A in either the clockwise or counter clockwise direction. A center of mass 96 of the rocker 30A can be located in relation to the pivot center 74 such that centrifugal force tends either to engage or to disengage the rocker 30A, depending on whether the rocker 30A is mounted to the inner race 12 or the outer race 14.

Referring to FIG. 2e, wherein like reference numbers refer to like components from FIGS. 1-2d, rockers 30B are substantially identical to rockers 30A except for their orientation with respect to the inner and outer races 12, 14. More specifically, rockers 30B are oriented such that each rocker 30B permits rotation of the outer race 14 with respect to the inner race 12 in the second direction and prevents rotation of the outer race 14 with respect to the inner race 12 in the first direction when the rocker 30B engages the teeth 40 of the outer race 14. In other words, rockers 30B are configured not to transmit torque between the inner and outer races 12, 14 in the first direction, and to transmit torque between the races 12, 14 in the second direction when the rockers 30B are engaged with the teeth 40.

Spring 34 biases the engagement arm 72 of rocker 30B into engagement with the teeth 40 and into notch 41. If the outer race 14 rotates counterclockwise with respect to the inner race 12, one of the teeth 40 contacts surface 80 of the rocker 30B, and rotation of the outer race 14 in the counterclockwise direction with respect to the inner race 12 is prevented in the same manner that rockers 30A prevent rotation of the outer race 14 in the clockwise direction. If the outer race 14 rotates clockwise with respect to the inner race 12, the teeth 40 will contact surface 76 of the rocker 30B such that the rocker 30B pivots and permits the teeth 40 to slide across surface 76, thereby permitting rotation of the outer race 14 in the clockwise direction with respect to the inner race 12.

Referring to FIGS. 3a and 3b, wherein like reference numbers refer to like components from FIGS. 1-2e, the selector ring 20 is selectively translatable in the axial direction from the first position (shown in FIGS. 2a and 2b) to a second position shown in FIGS. 3a and 3b. Windows 42 and wide portions 48 are sufficiently wide in the axial direction such that rockers 30A extend therethrough when the ring 20 is in the second position. Accordingly, the selector ring 20 permits rockers 30A to engage the teeth 40 of the outer ring 14 in both the first and second positions, and therefore the function of the rockers 30A is identical when the ring is in the first and second positions. However, when the ring is in the second position, portions 50 of the ring 20 are positioned radially between each of rockers 30B and the outer race 14 to prevent engagement of the rockers 30B with the teeth 40 of the outer race 14.

More specifically, and with reference to FIG. 3c, movement of the ring 20 from the first to the second position causes portion 50 to contact surface 76 and counteract the bias of spring 34, thereby to pivot the rocker 30B out of engagement with the teeth 40 of the outer race 14. In other words, the ring 20 in the second position retains the rockers 30B in a retracted position in which no part of the rockers 30B extends sufficiently radially to contact or otherwise interact with the teeth 40 or the notches 41.

Accordingly, with the selector ring 20 in the second position, the rockers 30A prevent the rotation of the outer race 14 in the clockwise direction, and rockers 30B do not engage the teeth, thereby allowing the outer race to rotate in the counterclockwise direction relative to the inner race 12. The ability of the clutch assembly to convey torque between the first and second races in one direction is selectively variable by translating the selector member. Movement of the selector member 20 from the first position to the second position causes the torque carrying ability of the clutch assembly 10 to change from dual-directional to single-directional.

Other selector ring configurations may be employed within the scope of the claimed invention to vary the engagement of rockers 30A, 30B. For example, the windows of the selector ring may be configured such that axial translation of the ring between various positions results causes the clutch assembly 10 to lock-up in either direction (i.e., clockwise or counter clockwise), lock-up in both directions, or over-run in both directions within the scope of the claimed invention.

The illustrations and descriptions have demonstrated the rocker elements 30A, 30B retained by and located at least partially within the inner race 12. Alternatively, and within the scope of the claimed invention, the rocker elements 30A, 30B may be retained in pockets formed by the outer race 14 and engage teeth defined by the inner race 12.

Figure 4:
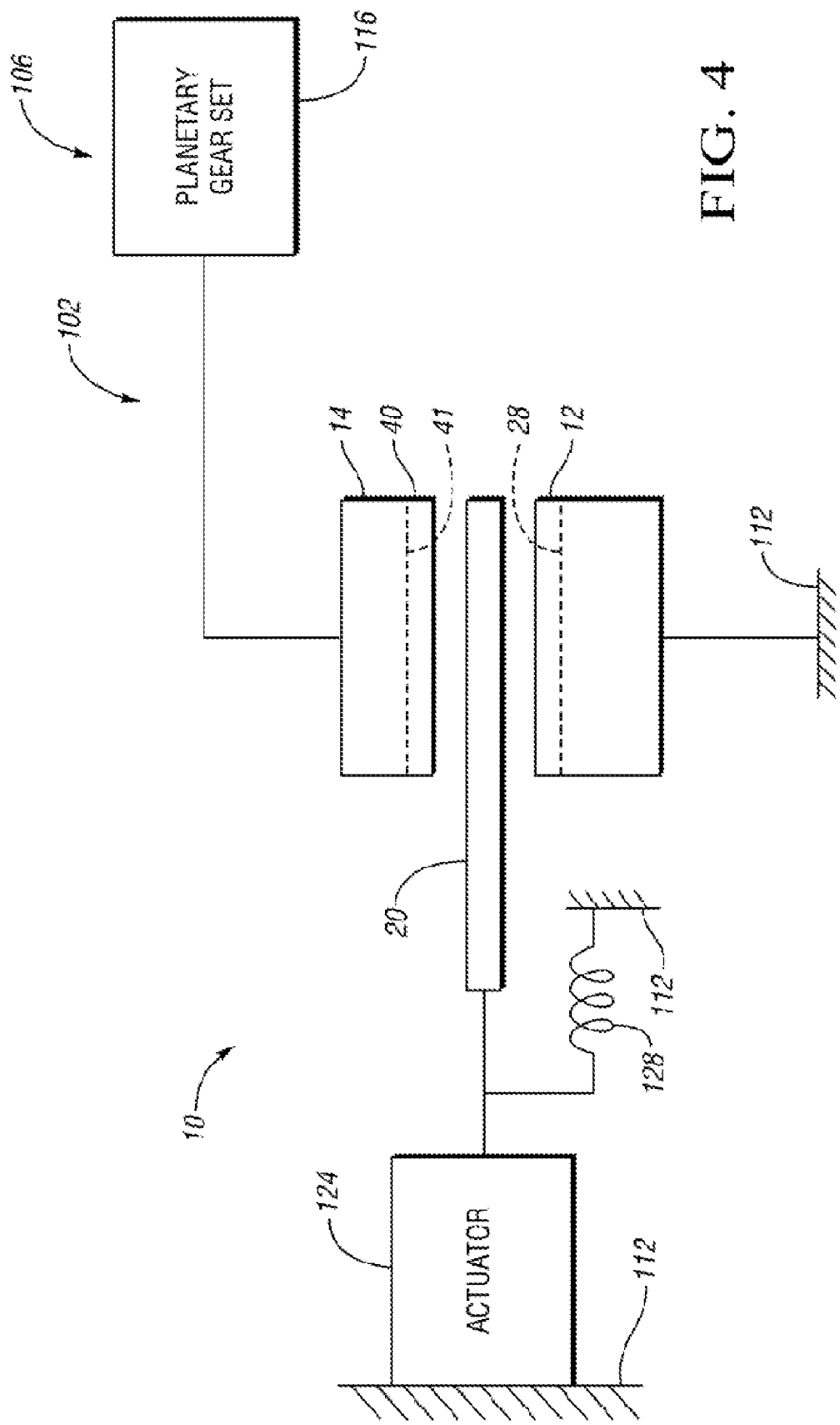
FIG. 4 is a schematic side view of a portion of the clutch assembly operatively connected to an actuator that is configured to selectively move the selector ring between the first and second positions.

Referring to FIG. 4, wherein like reference numbers refer to like components from FIGS. 1-3, the clutch assembly 10 is schematically depicted installed in a vehicle 102 as part of a powertrain component 106, which may, for example, be a dual clutch transmission (DCT), hybrid powertrain, manual transmission, automatic transmission, engine accessory drive, etc. The inner race 12 is mounted with respect to a stationary member 112, such as a transmission housing, chassis frame, or vehicle body, to prevent rotation of the inner race 12 with respect to the stationary member 112. The outer race 14 is mounted with respect to a rotatable member for rotation therewith. In the embodiment depicted, the rotatable member is a member of a planetary gearset 116.

An actuator 124, such as a hydraulically-actuated piston, solenoid, etc., is mounted with respect to the stationary member 112 and is configured to selectively translate the selector ring 20 relative to the stationary member 112 in the axial direction between the first and second positions. The actuator 124 is operatively connected to the ring 20 via the apply plate (shown at 22 in FIG. 1). A spring 128 operatively interconnects the stationary member 112 and the selector ring 20 to bias the selector ring in the first position. The ring 20 is prevented from rotating with respect to the stationary member 112, and therefore with respect to the inner race 12, such as by its connection to the apply plate (not shown in FIG. 4), so that the windows of the ring 20 maintain their alignment with a respective rocker. The apply plate is mounted with respect to the stationary member, such as via the teeth (shown at 54 in FIG. 1) so that the apply plate is axially translatable, but not rotatable with respect to the stationary member 112 and the inner race 12.

It should be noted that, if the actuator 124 is characterized by insufficient linear travel to move the selector ring 20 between the first and second positions, various linear travel amplifiers may be employed. In an exemplary embodiment, radially-oriented levers may interconnect the actuator and the ring. Alternatively, in place of a lever, a single slotted disk may be employed. The disk may also serve as a piston return spring if formed of an elastic material.

While the best modes for carrying out the invention have been described in detail, those familiar with the art to which this invention relates will recognize various alternative designs and embodiments for practicing the invention within the scope of the appended claims.

The invention claimed is:
1. A clutch assembly comprising:
a first race defining a plurality of pockets;
a second race being selectively rotatable with respect to the first race about an axis and defining a plurality of teeth;
a plurality of springs;
a plurality of rockers, each of said rockers being at least partially positioned within respective ones of said pockets, and being biased by a respective one of said springs into engagement with said teeth; and
a selector member being disposed such that the second race concentrically surrounds at least a portion of the selector member and being selectively axially translatable between a first position in which the member permits engagement of at least one of the rockers with said teeth, and a second position in which the member prevents engagement of said at least one of the rockers with said teeth;
wherein said plurality of rockers includes a first rocker and a second rocker; said first rocker being configured such that engagement of the first rocker with said teeth prevents rotation of the second race with respect to the first race in a first direction, and said second rocker being configured such that engagement of the second rocker with said teeth prevents rotation of the second race with respect to the first race in a second direction;
wherein the selector member defines an L-shaped aperture characterized by a wide portion through which said first rocker extends when the member is in the first and second positions, and a narrow portion through which said second rocker extends when the member is in the first position; and
wherein the wide portion, the narrow portion, the pockets, and the teeth are coplanar in a plane that is perpendicular to the axis.

2. The clutch assembly of claim 1, wherein the selector member is generally ring shaped.

3. The clutch assembly of claim 1, wherein the first rocker extends from the first race, through the wide portion, and into contact with the teeth when the selector member is in the first and second positions; wherein the second rocker extends from the first race, through the narrow portion, and into contact with the teeth when the selector member is in the first position, and wherein the selector member prevents contact between the second rocker and the teeth when the selector member is in the second position.

4. The clutch assembly of claim 1, further comprising an actuator operatively connected to the selector member and configured to selectively move the selector member between the first and second positions.

5. The clutch assembly of claim 1, wherein the first rocker is selectively pivotable about a pivot center; wherein the first rocker defines first and second circular cylindrical surfaces having respective arcs that are concentric with the pivot center.

* * * * *